United States Patent [19]

Gauthier et al.

[11] Patent Number: 5,302,810

[45] Date of Patent: * Apr. 12, 1994

[54] METHOD FOR RAPID AND UNIFORM HEATING OF A MULTILAYER ASSEMBLY COMPRISING AT LEAST ONE THIN LAYER BASED ON AN ION-CONDUCTING MACROMOLECULAR MATERIAL INTERLEAVED BETWEEN TWO STRUCTURES WITH HIGH ELECTRONIC CONDUCTION

[75] Inventors: Michel Gauthier, La Prairie, Canada; Philippe Ricoux, Oullins; Daniel Muller, Pau, both of France

[73] Assignees: Societe Nationale Elf Aquitaine, Courbevoie, France; Hydro-Quebec, Montreal, Canada

[*] Notice: The portion of the term of this patent subsequent to Jul. 14, 2009 has been disclaimed.

[21] Appl. No.: 635,522

[22] PCT Filed: May 10, 1990

[86] PCT No.: PCT/FR90/00326

§ 371 Date: Feb. 14, 1991

§ 102(e) Date: Feb. 14, 1991

[87] PCT Pub. No.: WO90/13925

PCT Pub. Date: Nov. 15, 1990

[30] Foreign Application Priority Data

May 10, 1989 [FR] France .................. 89/06110

[51] Int. Cl.$^5$ ............... H05B 3/16; H05B 1/00
[52] U.S. Cl. ..................... 219/543; 219/209
[58] Field of Search ............ 219/543, 209, 219, 203; 359/265, 275, 270; 492/192; 320/35, 36; 429/120, 26, 62

[56] References Cited

U.S. PATENT DOCUMENTS 2,442,380  6/1948  Schrodt ................. 219/200
4,828,369  5/1989  Hotomi ................. 350/357
5,130,842  7/1992  Gauthier et al. ......... 359/265

FOREIGN PATENT DOCUMENTS 0108179  5/1984  European Pat. Off. .
903078   9/1945  France .
2531300  2/1984  France .
2065027  6/1981  United Kingdom .
2164466  3/1986  United Kingdom .

OTHER PUBLICATIONS

Journal of Applied Physics, vol. 57, No. 1, Jan. 1985, American Institute of Physics, (Woodbury, N.Y., U.S.), M. Watanabe et al.: "Ionic Conductivity and Mobility in Network Polymers from Poly(propylene oxiode) Containing Lithium Perchlorate", pp. 123-128.
Patent Abstracts of Japan, vol. 12, No. 337 (E-657) (3184), Sep. 12, 1988, and JP, A, 6398971 (Hitachi Ltd.) Apr. 30, 1988.

*Primary Examiner*—Bruce A. Reynolds
*Assistant Examiner*—Michael D. Switzer
*Attorney, Agent, or Firm*—Oblon, Spivak, McClelland, Maier & Neustadt

[57] ABSTRACT

Between the high electronic conduction structures of the multilayer assembly an electric voltage signal is applied of which at least one portion includes an alternating component which has an amplitude between 0.05 and 100 volts and a frequency lower than 5 kHz and preferably between 2 and 2000 Hz so as to generate within the multilayer assembly an alternating ion current susceptible of producing a heating of the ion conducting macromolecular material by Joule effect. Application to the heating of electrochemical current generators in thin layers with solid polymer electrolyte or to the surface heating of elements of various regular or irregular shapes of which the surface is coated with the multilayer assembly.

30 Claims, 1 Drawing Sheet

METHOD FOR RAPID AND UNIFORM HEATING OF A MULTILAYER ASSEMBLY COMPRISING AT LEAST ONE THIN LAYER BASED ON AN ION-CONDUCTING MACROMOLECULAR MATERIAL INTERLEAVED BETWEEN TWO STRUCTURES WITH HIGH ELECTRONIC CONDUCTION

The invention relates to a method for rapid and uniform heating of a multilayer assembly comprising at least one thin layer of an ion-conducting macromolecular material, that is to say of a polymeric solid electrolyte, which is intercalated between two structures with high electronic conduction so as to be in intimate contact with the said structures.

A large class of multilayer assemblies of the abovementioned type is that of thin-layer electrochemical current generators, rechargeable or otherwise, among which there may be mentioned the electrochemical current generators which are described in reference EP-A-0,013,199 and which rely on an ion-conducting macromolecular material consisting of a solid solution of an ionisable alkali metal salt $M^+X^-$, especially a lithium salt, within a plastic polymeric material made up, at least partially, of one or more polymers and/or copolymers of monomers containing at least one heteroatom, especially oxygen or nitrogen, capable of forming bonds of the donor-acceptor type with the cation $M^+$.

Thin-layer electrochemical current generators make it possible to store a large quantity of energy per unit of volume and of weight. The power which they can deliver depends directly on the mobility of the ions in the ion-conducting macromolecular material, that is to say on the ion conductivity of this material.

It is known that the ion conductivity of ion-conducting macromolecular materials employed in thin-layer electrochemical current generators is relatively low at temperatures below or equal to room temperature, but that the said conductivity increases with temperature. It is therefore useful, when it is desired to make such generators operate at high instantaneous power, to be able to raise their temperature rapidly and, if possible, homogeneously.

This is particularly useful for making the best use of highly energetic, essentially primary, generators which have been stored for a long time at temperatures close to or below room temperature, which are particularly suited to a reduction or even a complete suppression of the self-discharge phenomenon. When rapidly heated, such generators can instantaneously supply extremely high powers even after several years' storage, provided that they can be heated rapidly and homogeneously just before their intensive use.

The use of an external source of heat for heating the abovementioned thin-layer current generators does not allow the required result to be obtained because operating in this way results in the appearance of a temperature gradient inside the generator, due to the poor diffusion of heat in the multilayer structure forming the generator, and this is reflected in a nonhomogeneous operation of the generator.

It has already been proposed, as described in reference GB-A-2,065,027, to perform the heating of a polymeric composition forming a thin layer and containing an ion-conducting macromolecular material consisting of a polyether coupled with an ionisable salt by relying on a heating technique using dielectric losses, which consists in subjecting the said composition to the action of electromagnetic waves of very high frequencies, namely frequencies of the order of $10^6$ to $10^8$ hertz.

Such a heating technique using dielectric losses is not suitable for heating thin-layer electrochemical current generators such as referred to above, or more generally for heating assemblies comprising at least one thin layer of an ion-conducting macromolecular material sandwiched between two structures with high electronic conduction because, apart from the difficulties linked with its implementation and the disadvantages which it entails for the environment owing to the use of electrical signals of very high frequency, this technique does not lend itself well to heating multilayer structures comprising a number of layers with high electronic conduction which are close to each other.

The subject of the invention is a method of rapid and uniform heating of a multilayer assembly comprising at least one thin layer of an ion-conducting macromolecular material intercalated between two structures with high electronic conduction so as to be in intimate contact with the said structures, which makes it possible to overcome the disadvantages of the methods of heating using an external source of heating or using dielectric losses.

BRIEF DESCRIPTION OF THE DRAWINGS

A more complete understanding of the invention and many of the attendant advantages thereof will be readily obtained as the same becomes better understood by reference to the following detailed description when considered in connection with the accompanying drawing, wherein:

the FIGURE shows an embodiment of the multilayer assembly of the invention of a macromolecular material sandwiched between two electrodes.

Figure 1:
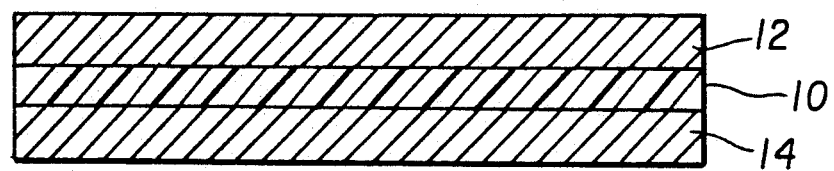

The method according to the invention is characterised in that between the structures with electronic conduction which are situated on both sides of each layer of ion-conducting macromolecular material an electrical voltage signal is applied, at least part of which comprises an alternating component which has a frequency of less than 5 kHz and an amplitude, that is to say a difference between its maximum and mean values, of between 0.05 and 100 volts, so as to generate in the multilayer assembly an alternating ion current capable of producing a heating of the ion-conducting macromolecular material by Joule effect.

The frequency of the alternating component of the electrical voltage signal applied between the structures with electronic conduction is advantageously more particularly between 2 and 2000 Hz and is preferably between 10 and 500 Hz. In addition, the preferred values of the amplitude of the said alternating component are between 0.05 and 30 volts.

The alternating component of the electrical voltage signal employed according to the invention may be sinusoidal or nonsinusoidal and may be uninterrupted or noncontinuous.

This alternating component may consist especially of a sinusoidal electrical voltage of a frequency equal to 50 or 60 Hz, generated by the sinusoidal alternating voltage supplied by the electricity supply systems.

A person skilled in the art will be easily capable of adjusting the electrical power to be supplied to the terminals of any multilayer assembly of the abovementioned type with a polymeric solid electrolyte, which it is desired to heat, to reach the desired temperature in a specified time by taking into account the size and the geometry of the said multilayer assembly to be heated, its heat capacity and its heat loss to the external environment.

In fact, the heat power dissipated in the polymeric solid electrolyte because of the alternating motion of the ions which it contains is of the form $U_A^2/Ri$, $U_A$ being the effective value of the alternating component of the electrical voltage signal applied and Ri denoting the ion resistance of the layer of polymeric solid electrolyte of the multilayer assembly to be heated. This same ion resistance is given by the relationship $Ri = K \times t/S$, in which K is the ionic resistivity of the polymeric solid electrolyte and t and S denote the thickness and the surface area respectively of the layer of polymeric solid electrolyte of the multilayer assembly. The heat power dissipated in the polymeric solid electrolyte is therefore of the form $U_A^2/Ri$ or $K \times U_A^2 \times S/t$.

The alternating voltage to be applied to a multilayer assembly in order to heat it with a given heat power is therefore proportionally lower the greater the surface area and the smaller the thickness of this assembly. Similarly, heating a system of n identical multilayer assembly requires the application of an alternating voltage which is higher (coupled with a lower intensity) when these n elements are connected in series than when these n elements are connected in a parallel configuration.

When the multilayer assembly is being heated, the intensity of the alternating current which is generated within the ion-conducting macromolecular material as a result of the application of the electrical voltage signal with an alternating component between the structures with electronic conduction tends to increase with temperature because of the decrease in the resistance of the ion-conducting material. If need be, the temperature within the said ion-conducting material can be monitored when the multilayer assembly is being heated in order not to exceed a predetermined value, it being possible for the said monitoring to be carried out either by employing an electrical voltage signal whose alternating component has a constant effective value and by limiting the intensity of the alternating current generated or else by keeping constant the intensity of the alternating current flowing in the ion-conducting material and by limiting the amplitude of the alternating component of the electrical voltage signal. These techniques of thermal control of the temperature of a conductor are well-known in the art and will not therefore be described in detail.

The FIGURE shows a multilayer assembly embodiment of the present invention in which an ion conducting macromolecular material 10 is intercalated between two highly electrically conducting layers 12 and 14.

A "thin layer" of the ion-conducting macromolecular material means a layer of the said material whose thickness which actually corresponds to the distance separating the two structures with high electronic conduction situated on both side of the ion-conducting macromolecular material, is low in relation to the areas of contact of this macromolecular material with the adjacent layers formed by the structures with high electronic conduction. The thickness of the thin layer of ion-conducting macromolecular material is advantageously between 5 μm and 2000 μm, it being necessary for the said thickness to be as uniform as possible.

The ion-conducting macromolecular material may be any one of the polymer-based materials capable of simultaneously having an ion conductivity of at least $10^{-7}$ siemens/cm at room temperature and an electronic conductivity of less than $10^{-10}$ siemens/cm.

The ion-conducting macromolecular material may, in particular, consist of a solid solution of at least one ionisable salt, especially an alkali metal salt and in particular a lithium salt, in a plastic polymeric material made up at least partly of one or more polymers and/or copolymers of monomers containing at least one heteroatom, especially oxygen or nitrogen, capable of forming bonds of the donor/acceptor type with the cation of the ionisable salt, the said polymer(s) being chosen in particular from polyethers and especially from ethylene oxide or propylene oxide homopolymers (cf. EP-A-0,013,199). In the improvements made to the solid solutions of the abovementioned type the plastic polymeric material may consist in particular of a copolymer of ethylene oxide and of at least one other cyclic oxide, the said copolymer having either the structure of a random copolymer (U.S.-A-4,578,326) which may be optionally crosslinked (FR-A-2,570,224) or else the form of a network of the urethane type resulting from the reaction of a block copolymer of ethylene oxide and of at least one other cyclic oxide with a coupling agent consisting of an organic polyisocyanate (FR-A-2,485,274). In addition, the ionisable salts mentioned in reference EP-A-0,013,199 may be partly or wholly replaced by ionisable salts such as alkali metal choloroboranes (FR-A-2,523,770), alkali metal tetrakistrialkylsiloxyalanates (FR-A-2,527,611), alkalimetal bis(perhaloalkylsulfonyl-)imides or bis(perhaloacyl)imides (FR-A-2,527,602), alkali metal tetraalkynylborates or aluminates (FR-A-2,527,610), alkali metal derivatives of perhaloalkylsulphonylmethane or perhaloacylmethane compounds (FR-A-2,606,218) or else alkali metal salts of polyethoxylated anions (EP-A-0,213,985).

The ion-conducting macromolecular material may further consist of a solid solution of an ionisable salt, for example a salt such as described in the abovementioned references, in a polymeric material consisting of an organometallic polymer in which at least two polyether chains are linked by a metal atom chosen from Al, Zn and Mg (FR-A-2,557,735) or from Si, Cd, B and Ti (FR-A-2,565,413) or else of a polymeric material consisting of a polyphosphazene carrying two polyether groups such as polyoxyethylene groups on each phosphorus atom.

The ion-conducting macromolecular material can also be chosen from mixtures of polymers of polar nature and/or solvating with any salt, acid or base which is sufficiently dissociated in the polymer to obtain the appropriate ion conductivity or else from polymers carrying ionisable functional groups producing anions or cations attached to the macromolecular chains or else from protonic conductors such as those described in reference FR-A-2,593,328 or mixtures of inert polymers with inorganic or organic ion-conducting materials dispersed in the polymeric matrix.

A structure with high electronic conduction means, according to the invention any composite material capable of reaching electronic conductivities higher than $10^{-8}$ siemens/cm. These may be the various materials generally employed as electrode collectors, that is to say in particular films, tapes or plates of a conductive metal such as Cu, Al, Ag, Ni, Zn or else of an organic material such as polyacetylene, polypyrrole, polyanilines or any other unsaturated polymer whether doped or not with ionic compounds. These may also be insulating materials such as glasses or plastics coated with conductive deposits, the said deposits being produced by various methods such as metallisation, chemical deposition in vacuum, cathodic sputtering or lamination.

The structure with electronic conduction may also consist of a composite material in which at least one of the components exhibits a sufficient electronic conductivity and, by way of examples, there may be mentioned certain composite electrodes, especially those described in reference EP-A-0,013,199, which couple a substance with electronic conduction such as carbon black with various electrochemically active materials, such electrodes being employed especially in primary or secondary electrochemical current generators with polymeric solid electrolyte in the form of thin layers.

As indicated above, the method according to the invention can be applied in particular to the heating of multilayer assemblies consisting of rechargeable or nonrechargeable electrochemical current generators which consist of at least one thin layer of a polymeric solid electrolyte, that is to say of an ion-conducting macromolecular material such as defined above, sandwiched between two electrodes, which form the structures with high electronic conduction and may have any suitable arrangement and in particular the composite electrode arrangement described in the references which are quoted above.

The electrochemical current generators of the abovementioned type can be employed especially for feeding electric motors fitted to various portable pieces of equipment such as drills, vacuum cleaners, hedge trimmers, lawnmowers and, as a result of their flexible configuration, they can be arranged in contact with the electric motors which they feed, and this makes it possible to produce pieces of equipment with built-in current generators. In such applications of the above-mentioned current generators as built-in generators, after the generator has been heated throughout to the most appropriate temperature for its operation by making use of the heating method according to the invention, the heat generated, inter alia by the heat loss of the electric motor of the piece of equipment fed by the generator, is sufficient, on condition that the heat management of the system is monitored, to maintain the generator which is fitted close to the motor in a temperature range enabling the said generator to operate under optimum conditions. For example, a sufficient number of current generators with a polymeric solid electrolyte in the form of thin layers can be arranged around the electric motor of a lawnmower to form a battery providing a predetermined independent operation for, for example, two to three hours. By heating the generators throughout, using the method according to the invention, when they are being recharged, if they are rechargeable, or/and just before they are used, more than 80% of the nominal capacity of the battery can be available during the predetermined period of operation.

In the case of a thin-layer electrochemical current generator such as mentioned above of the nonrechargeable type, the stage of heating the said generator by applying the method according to the invention can be performed before the generator is used or at the beginning of the said use.

The electrical voltage applied to the nonrechargeable generator is advantageously the sum of an alternating component such as defined above and of a direct voltage whose value is at least equal to the open-circuit voltage of the said generator, it being possible for the said alternating and direct voltages to be applied simultaneously and separately or else in the form of a single voltage resulting from their sum.

In the case of a thin-layer electrochemical current generator such as mentioned above of the rechargeable type, the stage of heating this generator using the method according to the invention can be carried out either as shown above for a nonrechargeable thin-layer electrochemical current generator and/or during at least a part of the recharging cycle of the generator. In the case of a heating performed during the recharging cycle of the generator, the electrical voltage applied to the generator to be recharged is advantageously the sum of a voltage or alternating component such as defined above and of a direct electrical voltage whose value is at least equal to the nominal voltage of the charged generator, it being possible for the said alternating and direct voltages to be applied simultaneously and separately or else in the form of a single voltage resulting from their sum. The heating of the generator during the recharging cycles makes it possible to shorten the recharging time substantially.

When a number of thin-layer electrochemical current generators of the abovementioned type are combined to form the current generator, at least one of the said unit generators can be used to produce, alternately if necessary, the alternating voltage which can be employed for heating the other unit generators.

The method according to the invention can also be applied to the surface heating of units of various shapes, whose surface is provided with a multilayer assembly comprising a thin layer of a polymeric solid electrolyte consisting of an ion-conducting macromolecular material such as defined above intercalated between two electrically conductive layers forming structures with high electronic conduction as shown above, the voltage applied between the said structures being purely alternating in this case.

It is thus possible to produce domestic heating systems using radiant panels, for which it is known that they simultaneously permit an improved comfort and substantial energy savings. For example, in an application of this type the multilayer assembly can be produced in the form of a heating tapestry obtained by bonding to a sheet of metallised paper, which can be glued onto walls and partitions like an ordinary wallpaper, a thin layer of ion-conducting macromolecular material and then a layer of a material which is also a good electronic conductor such as, for example, a second sheet of metallised paper or plastic or a thin sheet of an electronically conductive metal. This heating technique, which relies on the method according to the invention, offers a number of advantages, among which may be mentioned the use of very low voltages devoid of danger in the case of a domestic use, the ability to withstand partial tearing of the heating wall-covering without modifying its nominal power, the possibility of piercing and nailing without danger, because the short circuit which is temporarily created results in the local destruction of one of the conductive coatings with natural local healing by the ion-conducting macromolecular material (polymeric solid electrolyte), the proportion of surface which is destroyed being negligible compared with the total area of the multilayer assembly forming the heating wall-covering.

When the unit to be heated at the surface has a nonuniform surface, the multilayer assembly is produced on the surface of the said unit using painting techniques by operating, for example, as follows. First of all, a layer of an electronically conductive material chosen from metal powders, carbon black and conductive polymers, especially polymers bearing conjugated unsaturated bonds such as mentioned above is deposited onto the said surface, for example in a solvent phase or by electrostatic spraying with a gun, and on the conductive surface thus produced a small region is kept aside, which will be protected from coating by the following layers and which is intended for making contact with the electrode formed by the layer of electronically conductive material thus formed. A second thin layer of ion-conducting macromolecular material is then deposited onto the layer of electronically conductive material by any suitable technique, for example spraying with a gun, soaking or spreading. Finally, a third layer of an electronically conductive material such as shown above is deposited onto this second layer, this third layer acting as a second electrode. A region allowing an electrical connection to be made with the source of alternating voltage is arranged in this layer, it being possible to make the said connection, for example, by welding or local application of a conductive paste such as, especially, a silver-filled epoxy resin. The deposition of the first conductive layer onto the surface of the unit to be heated at the surface can be avoided when the said surface already has a sufficient electronic conductivity to act as a first electrode.

The alternating voltage which can be employed to produce the heating of the multilayer assembly can be generated by any known source of alternating voltage capable of delivering an alternating electrical voltage which has the form of an uninterrupted signal or of a pulsed signal exhibiting the frequency and amplitude characteristics defined above. When the multilayer assembly is of the current-generator type the source of alternating voltage can be integrated into the said generator or else into the apparatus employing this generator or, furthermore, into the charger employed for recharging the generator.

The following examples are given to illustrate the invention without any limitation being implied.

EXAMPLE 1

In order to demonstrate the reversibility of the phenomena involved in the application of the method according to the invention, a 4-cm$^2$ device was produced by placing in contact, on each of the faces of a 50-$\mu$m thick film of polymeric solid electrolyte, a 20-$\mu$m thick composite electrode made of acetylene black dispersed in a polymeric solid electrolyte of the same kind as that of the film, the said electrode being carried by a 25-$\mu$m thick aluminium foil. The polymeric solid electrolyte consisted of a solid solution of lithium perchlorate in a copolymer of ethylene oxide and of methyl glycidyl ether, the said copolymer containing 90 mol % of ethylene oxide and the said solid solution having a molar ratio of oxygen atoms of the ether functional groups to the lithium ions whose value was approximately 20.

The device thus formed, whose e.m.f. was initially 0 volts and the temperature was 23° C. was insulated thermally and placed in contact with a miniaturised thermocouple to make it possible to follow rapidly any heat effect generated. The electrode collectors were connected to the terminals of a potentiometer operating at 60 cycles/second and controlled at 10-volt output. As soon as the potentiometer was switched on the temperature rose rapidly to reach approximately 60° C. after approximately 30 seconds. The test was repeated a number of times and the same effect was observed. When the potentiometer was controlled at 20 volts the abovementioned temperature was reached after approximately 10 seconds and the alternating current observed changed from approximately 60 mA to approximately 150–200 mA. When the alternating signal was maintained for longer than the times shown above the current tended to increase as a result of a decrease in the internal resistance of the device. When the e.m.f. was checked after these various tests the voltage observed was still 0 volts. This, together with the internal resistance which remains unchanged at 24° C., confirms that the effects are reversible and that no permanent damage was produced. The power dissipated in a device of this kind was therefore of the order of 0.6 watts for an area employed of approximately 4 cm$^2$.

EXAMPLE 2

A thin-layer lithium current generator was produced, consisting of a layer of a polymeric solid electrolyte sandwiched between a positive electrode and a negative electrode.

The layer of polymeric solid electrolyte had a thickness of 40 $\mu$m and consisted of a solid solution containing 10% by weight of lithium perchlorate in a copolymer of ethylene oxide and of methyl glycidyl ether, the said copolymer containing 80% of ethylene oxide by weight.

The positive electrode resulted from the agglomeration, into a homogeneous mass, of titanium sulphide powder, of carbon black and of a polymeric solid electrolyte consisting of the abovementioned solid solution, so as to have a lithium content over the electrode corresponding to 4 coulombs/cm$^2$, that is approximately 0.29 mg/cm$^2$ of lithium, the said electrode being deposited onto a collector consisting of an aluminium foil of 20-$\mu$m thickness.

The negative electrode consisted of a 20-$\mu$m thick lithium foil laminated onto a current collector consisting of a 12-$\mu$m thick copper foil.

The generator assembly, 20 cm$^2$ in area, was sealed in a flexible metal-and-plastic package based on laminated thin foils of polyester, aluminium and polyethylene. This package makes it possible at the same time to make contact with the positive and negative electrodes and acts as a barrier material against water and oxygen, allowing the generator to operate for many charge-discharge cycles.

The generator thus constituted had a mean voltage of 2.1 volts which changed from 3.5 to 1.6 volts during normal discharge and it made it possible to obtain a correct use of the installed electrical capacity equal to 80 coulombs, which corresponds to 22.2 milliamperehours for any discharge rate lower than 2 milliamperes, that is for any discharge of the generator over a period longer than 10 hours. When producing generator discharges consuming more current, a rapid fall was observed in the proportion of utilisation of the electrical capacity of the said generator, only 50% of which could be used any longer for a discharge at 4 milliamperes, 20% for a discharge at 10 milliamperes and 5% for a discharge at 20 milliamperes.

An electrical voltage signal resulting from the superposition of an alternating voltage with an amplitude of 3 volts and a frequency of 50 hertz and of a direct voltage equal to 2.5 volts was applied to the generator produced as indicated above, before subjecting it to a discharge, the operation being carried out so that the positive terminal of the generator was connected to the alternating phase of higher mean voltage. After a few minutes the application of the said alternating voltage resulted in a temperature rise of the generator from 22° C. to 60° C. From then on the generator could produce a mean current of 8 milliamperes corresponding to a total discharge over 2 hours (C/2). When having available a sufficient insulation or thermal inertia to maintain the generator at a temperature above 30° C., such a current could be maintained for about a hundred minutes (that is approximately 80% of the total capacity of the generator). Without producing the heating according to the invention, the use of the generator at the same discharge rate at room temperature lasted only approximately 20 minutes in the case of a final voltage of 1.6 volts, which corresponds to a utilisation of less than 15% of the generator's capacity.

EXAMPLE 3

The generator as described in Example 2 required a recharging period of at least ten hours at a constant rate of 2.2 milliamperes to obtain a complete recharge, at room temperature, to its capacity C, equal to 4 coulombs/cm$^2$. When a more rapid recharge was imposed at 25° C. by the use of a higher intensity while the maximum recharge voltage threshold was maintained at 3.5 volts, a faster rise in this voltage was observed at the end of charging, corresponding to the end of the possible recharge, resulting in a smaller quantity of stored energy.

In other words, there is a limitation to recharge rates lower than or equal to C/10 if it is desired to achieve complete recharges at room temperature without damage.

The discharged generator was subjected to an alternating signal which had a frequency of 50 hertz and an amplitude of 4 volts superposed on a direct voltage equal to the discharged generator's own voltage. A rapid rise in temperature to about 50°-60° C. was observed, and this then made it possible to recharge the generator fully at rates which were five times faster over a period which was five times shorter than when the generator is kept at room temperature. It was thus possible to perform the complete recharging of the generator in two hours by applying a mean intensity of 11 milliamperes after heating, whereas this could be performed only in at least 10 hours at room temperature.

Results which were comparable to the abovementioned results according to the invention were obtained by subjecting the discharged generator to a recharge by making use of a potentiostatic charger (constant-voltage charger), which applied between the electrodes of the generator an electrical voltage signal resulting from the superposition of the abovementioned alternating voltage with an amplitude of 4 volts and a frequency of 50 hertz on the direct recharging voltage fixed at 3.5 volts.

EXAMPLE 4

Heating wall coverings were produced by combining a 150-μm thick paper sheet metallised on one face with a 1 to 20-μm thickness of copper, a layer of a polymeric solid electrolyte which had a thickness of between 5 μm and 100 μm, the said electrolyte consisting of a solid solution containing 10% by weight of KSCN dissolved in a copolymer of ethylene oxide and of butylene oxide containing 70% by weight of ethylene oxide, and a 20-μm thick polypropylene foil metallised on one face by vacuum deposition of a very fine layer of a good conductor metal such as copper, so as to constitute multilayer assemblies in which the layer of polymeric solid electrolyte was arranged between the two metallised sheets and adhered strongly to the metal deposit present on each of the said sheets.

Bonding of the layer of polymeric solid electrolyte in contact with the metal deposits present on the metallised sheets was produced by coating the layer of electrolyte onto the metallised paper, the operation being carried out by melt extrusion or else by coating with a solution of the salt and of the copolymer in a common solvent and evaporation of the said solvent to form a metallised paper/polymeric solid electrolyte composite and then by laminating the said composite with the metallised polypropylene foil, these operations being carried out so that in places each of the metal deposits facing the electrolyte layer overlaps slightly the area in contact with the electrolyte to form a small flap of free metal conductor overlapping the multilayer assembly obtained. The multilayer assemblies formed as described above were glued, on the paper sheet side, onto plaster panels to form radiant panels.

In the case of each of the panels thus obtained an alternating voltage with an amplitude of between 5 and 20 volts and a frequency ranging from 10 to 100 hertz, depending on the test, was applied between the metal conductive deposits of the multilayer assembly of the panel in question, by means of the associated small flaps, and a rapid rise was observed in the temperature of the multilayer assembly which dissipated the heat resulting from this temperature rise into the surrounding environment.

The dissipated power, which corresponds to the product of the current supplied at a given voltage, multiplied by the said voltage, depends directly on the applied voltage.

This current is proportional to the area of the heating coating, to the ion conductivity of the polymeric solid electrolyte and inversely proportional to the thickness of the said electrolyte. The power dissipated generally has values of less than 0.05 watts per cm$^2$, that is 5 milliamperes per cm$^2$ for an alternating voltage of 10 volts.

The temperature rise on heating depends on the electrical power dissipated by Joule effect and on the heat capacity and the thermal conductivity of the support onto which the heating multilayer assembly is attached.

The heating coatings can also be produced in the form of transparent multilayer assemblies in which a layer of a polymeric solid electrolyte such as defined above and transparent in the layer thicknesses which are employed is sandwiched between two transparent current-collecting supports, each consisting of a transparent foil carrying a current-conducting transparent deposit on its side facing the polymeric solid electrolyte, the said layer of polymeric solid electrolyte adhering strongly to the transparent conductive deposit of each of the said current-collecting supports. These transparent current-collecting supports can be obtained, for example, by vacuum deposition of very fine layers of metal oxides of the mixed tin and indium oxide type (abbreviated to ITO) or else tin oxide doped onto transparent films of a plastic substance, especially polypropylene- or polyester-based films. The polymeric solid electrolyte may advantageously consist of a solid solution of at least one ionisable salt in a polymeric material made up at least partially of one or more copolymers of ethylene oxide and of at least one other cyclic ether.

Such heating coatings, which are capable of being heated by the application of an alternating voltage according to the invention between the conductive deposits of the current collectors arranged on both sides of the layer of polymeric solid electrolyte, can be applied, for example by adhesive bonding, onto supporting optical systems such as domestic or motor vehicle windows, rearview mirrors, mirrors or, further, various luminous signalling systems, to provide the said optical systems with heating for the purpose of defrosting and/or demisting without appreciable detriment to the optical properties specific to these optical systems. The combination of the supporting optical system, especially a transparent support such as a window, or a reflecting support, especially a rear view-mirror or mirror, and of the heating transparent coating constitutes an assembly which can be described as a controlled-temperature optical system.

We claim:

1. A method for rapidly and uniformly heating a multilayer assembly comprising at least one thin layer of an ion-conducting macromolecular material, intercalated between two structures having high electronic conduction so as to be in intimate contact with the said structures, which comprises:
applying an electrical voltage between the structures with high electronic conduction which are situated on either side of each layer of ion-conducting macromolecular material, at least a part of the voltage comprising an alternating component which has a frequency of less than 5 kHz and an amplitude of between 0.05 and 100 volts, so as to generate in the multilayer assembly an alternating ion current capable of effecting heating of the ion-conducting macromolecular material by the Joule effect.

2. The method according to claim 1 wherein the amplitude of the alternating component of the electrical voltage signal applied between the structures with high electronic conduction ranges from 0.05 to 30 volts.

3. The method according to claim 1, wherein the alternating component of voltage is an uninterrupted signal which is a sinusoidal signal or a noncontinuous signal.

4. The method according to claim 1, wherein the thin layer of ion-conducting macromolecular material of the multilayer assembly has a thickness ranging from 5 $\mu$m to 2,000 $\mu$m.

5. The method according to claim 1, wherein the ion-conducting macromolecular material has simultaneously an ion conductivity of at least $10^{-7}$ siemens/cm at room temperature and an electronic conductivity of less than $10^{-10}$ siemens/cm.

6. The method according to claim 5, wherein the ion-conducting macromolecular material consists of a solid solution of at least one ionizable alkali metal salt, in a plastic polymeric material made up at least partly of one or more polymers and/or copolymers of monomers containing at least one heteroatom, capable of forming bonds of the donor/acceptor type with the cation of the ionizable salt.

7. The method according to claim 5, wherein the ion-conducting macromolecular material consists of a solid solution of an ionizable salt in a polymer selected from the group consisting of organometallic polymers in which at least two polyether chains are linked by a metal atom selected from the group consisting of Al, Zn, Mg, Si, Cd, B and Ti and from polyphosphazenes carrying two polyether groups on each phosphorus atom.

8. The method according to claim 5, wherein the ion-conducting macromolecular material is selected from the group consisting of mixtures of polymers of polar nature and/or solvating with any salt, acid or base which is sufficiently dissociated in the polymer to obtain the desired ion conductivity, polymers carrying ionizable functional groups producing anions or cations attached to the macromolecular chains, polymeric protonic conductors and mixtures of inert polymers with inorganic or organic ion-conducting materials dispersed in the polymeric matrix.

9. The method according to claim 1, wherein the structures with electronic conduction are made of materials exhibiting electronic conductivities higher than $10^{-8}$ siemens/cm.

10. The method according to claim 1, wherein the multilayer assembly subjected to heating consists of a rechargeable or nonrechargeable electrochemical current generator which consists of at least one thin layer of the ion-containing macromolecular material, or polymeric solid electrolyte, sandwiched between two electrodes which form the structures with high electronic conduction.

11. The method according to claim 10, wherein the stage of heating the generator is performed before its use or at the beginning of use.

12. The method according to claim 11, wherein the electrical voltage employed for heating is the resultant of the alternating component of voltage and of a direct voltage whose value is at least equal to the open-circuit voltage of the generator.

13. The method according to claim 12, wherein the said alternating and direct voltages are applied simultaneously and separately or in the form of a single voltage resulting from their superposition.

14. The method according to claim 10, wherein the electrochemical current generator is rechargeable and the stage of heating the said generator is performed during at least a part of the recharging cycle of the generator.

15. The method according to claim 14, wherein the electrical voltage employed for heating is the resultant of the alternating component of voltage and of a direct voltage whose value is at least equal to the nominal voltage of the charged generator.

16. The method according to claim 15, wherein the said alternating and direct voltages are applied simultaneously and separately or in the form of a single voltage resulting from their superposition.

17. The method according to claim 10, wherein a number of thin-layer electrochemical generators are combined to form a current generator and wherein at least one of the said electrochemical generators is employed, alternately if necessary, to produce the alternating voltage which can be employed for heating the other generators.

18. The method according to claim 1, wherein the multilayer assembly comprises a thin layer of polymeric solid electrolyte or ion-conducting macromolecular material intercalated between two electrically conductive layers forming structures with high electronic conduction and is arranged on the surface of a unit of any shape which it is desired to heat at the surface and wherein the voltage applied between the structures with high electronic conduction is solely alternating.

19. The method according to claim 18, wherein the multilayer assembly is formed at the surface of the unit to be heated at the surface using painting techniques.

20. The method according to claim 19, wherein the surface of the unit to be heated at the surface has a sufficient electronic conductivity to act as an electrode and wherein onto the said surface is deposited only the layer of polymeric solid electrolyte and the corresponding electrically conductive layer is deposited onto the latter.

21. The method according to claim 1, wherein the frequency of the alternating component of the electrical voltage signal applied between the structures with high electronic conduction ranges from 2 to 2,000 Hz.

22. The method according to claim 21, wherein said frequency ranges from 10 to 500 Hz.

23. The method according to claim 1, wherein the temperature within the ion-conducting macromolecular material is monitored in order not to exceed a predetermined temperature, the said monitoring being conducted by employing an electrical voltage signal whose alternating component has a constant effective value and by limiting the intensity of the alternating current generated.

24. The method according to claim 1, wherein the temperature within the ion-conducting macromolecular material is monitored in order not to exceed a predetermined temperature, the said monitoring being carried out by keeping constant the intensity of the alternating current flowing in the ion-conducting material and by limiting the amplitude of the alternating component of the electrical voltage signal.

25. The method according to claim 6, wherein the ionizable alkali metal salt is a lithium salt.

26. The method according to claim 7, wherein said polyphosphazene is one which carries two polyoxyethylene groups on each phosphorus atom.

27. The method according to claim 6, wherein the said polymer or copolymer are polyethers.

28. The method according to claim 27, wherein said polyether is an ethylene oxide polymer, a propylene oxide polymer or a copolymer of ethylene oxide and at least one cyclic ether.

29. The method according to claim 18, wherein the electrically conductive layers of the multilayer assembly arranged at the surface of the unit to be heated on its surface, each consist of a conductive deposit which is provided on one face of a paper or plastic foil, which conductive deposit is in contact with the ion-conducting macromolecular material.

30. The method according to claim 29, wherein said conductive deposit is a metal deposit.

* * * * *